United States Patent
Genissel

(10) Patent No.: US 8,577,521 B2
(45) Date of Patent: Nov. 5, 2013

(54) ON-BOARD AERONAUTICAL SYSTEM WITH DYNAMIC RECONFIGURATION, ASSOCIATED METHOD AND AIRCRAFT CARRYING SUCH A SYSTEM

(75) Inventor: Jean-Paul Genissel, Pibrac (FR)

(73) Assignee: Airbus Operations, Toulouse (FR)

( * ) Notice: Subject to any disclaimer, the term of this patent is extended or adjusted under 35 U.S.C. 154(b) by 1104 days.

(21) Appl. No.: 12/509,866

(22) Filed: Jul. 27, 2009

(65) Prior Publication Data

US 2010/0100286 A1    Apr. 22, 2010

(30) Foreign Application Priority Data

Jul. 30, 2008    (FR) ...................................... 08 55261

(51) Int. Cl.
*G06F 17/00*    (2006.01)
*G06F 19/00*    (2011.01)

(52) U.S. Cl.
USPC ............................... 701/14; 701/36; 244/99.4

(58) Field of Classification Search
USPC ................ 701/48, 3, 14, 36, 29.2, 32.7, 29.1, 701/31.6, 34.2, 34.3; 700/19; 244/99.4, 244/99.9, 99.2, 194, 76 R; 702/183; 709/204
See application file for complete search history.

(56) References Cited

U.S. PATENT DOCUMENTS

| | | | |
|---|---|---|---|
| 6,484,082 B1 * | 11/2002 | Millsap et al. | ................... 701/48 |
| 7,962,259 B2 * | 6/2011 | Schafer et al. | ................... 701/36 |
| 2003/0195673 A1 | 10/2003 | Foch et al. | |
| 2003/0208579 A1 | 11/2003 | Brady, Jr. et al. | |
| 2004/0083044 A1 * | 4/2004 | Akiyama et al. | ................ 701/48 |
| 2004/0249521 A1 * | 12/2004 | Petersen et al. | .................... 701/3 |
| 2006/0116803 A1 | 6/2006 | Armbruster et al. | |
| 2007/0115938 A1 * | 5/2007 | Conzachi et al. | ............. 370/352 |

* cited by examiner

*Primary Examiner* — Christine Behncke
(74) *Attorney, Agent, or Firm* — Oblon, Spivak, McClelland, Maier & Neustadt, L.L.P.

(57) ABSTRACT

The present invention relates to an on-board aeronautic system intended to be dynamically reconfigured, especially an on-board information system, and to an associated method as well as to an aircraft comprising such a system. In particular, the system comprises a plurality of heterogeneous equipment items, at least part of the said equipment items being reconfigurable, and comprises a reconfiguration management center set up to receive state messages from the said plurality of equipment items and to emit reconfiguration messages destined for the said reconfigurable equipment items as a function of at least the said received messages, the said state messages being emitted according to the same format by monitoring means encompassed in each of the said equipment items, the reconfigurable equipment items encompassing reconfiguration means capable of processing at least one of the said reconfiguration messages in order to reconfigure the said associated equipment item.

16 Claims, 8 Drawing Sheets

ON-BOARD AERONAUTICAL SYSTEM WITH DYNAMIC RECONFIGURATION, ASSOCIATED METHOD AND AIRCRAFT CARRYING SUCH A SYSTEM

The invention relates to an on-board aeronautic system intended to be dynamically reconfigured, especially an on-board information system, and to an associated method as well as to an aircraft comprising such a system.

In aeronautic systems, a large number of processing equipment units is useful for the operation of the aircraft, and must be adapted to environmental conditions that sometimes vary. In particular there can be cited the dynamic allocation of processing resources such as memories, central processors, network capacities, power distribution, or else the reconfiguration of equipment in the case of failures, generally of physical nature (hardware), albeit also envisioned for the logical parts (software).

The response then is generally equipment reconfiguration. The latter is the operation by which an equipment item is changed from one configuration defined by functional and/or physical characteristics to another configuration defined by another set of characteristics. Such reconfiguration is said to be dynamic when this configuration change is carried out and is effective even while the equipment continues to operate. In general, dynamic reconfiguration is conducted by reconfiguring the system one part at a time in such a way as to ensure that one operational part assuring proper operation of the system is always available at every instant in the course of reconfiguration.

In contrast, static reconfiguration requires a restart of the reconfigured equipment in order to take a new configuration into account.

By virtue of the flexibility of use resulting from the equipment in question, dynamic reconfiguration contributes numerous advantages to digital systems, especially that of adapting rapidly to new functionalities, to changes of its environment and of its conditions of use, or that of supporting multiple standards, the equipment remaining operational at all times.

Dynamic reconfigurations of on-board systems are already practiced in the field of aeronautics. In particular, in the field of military aviation, the system architecture known as ASAAC ("Allied Standards Avionics Architecture Council") proposes dynamic reconfiguration of modular equipment software aimed at alleviating a failure of one module, of tracking mission profiles or else of conforming with safety rules.

Again in the field of aeronautics, U.S. Pat. No. 6,389,335 for its part describes a traditional system that employs dynamic reconfiguration. A measurement signal from a monitored equipment item, issued by a transducer, is compared here with an expected signal, in such a way as to identify a possible failure of the transducer. Depending on the degree of failure of the latter, the flight control program is modified to ensure that the flight control actuators are activated, while disregarding the detected failure.

Such dynamic reconfiguration mechanisms are characteristic of a specific monitored equipment item or function.

In aeronautics, it happens that the increasing complexity of the processing operations now requires that distributed systems be given priority over centralized systems, in order to impart tolerance to breakdowns, performance and scalability (evolution capacity).

By definition, a distributed system is formed of heterogeneous equipment items or components. By "heterogeneous elements" there are understood here elements of different natures, in particular communicating by nature according to separate protocols or formats (as regards the driver commands of these elements and the messages emitted by these elements).

This results in a difficulty within the scope of globalized reconfiguration management, in which information items originating from different equipment items are taken into account to act specifically on one of them. In fact, since each equipment item is generally different from its neighbor, the management of their reconfiguration must be adapted to the specific natures of each of them.

Although the known prior art solutions provided for dynamic reconfiguration management can be envisioned individually for each of the heterogeneous equipment items, only independent management of one equipment item at a time would be achievable.

The present invention is aimed at alleviating these disadvantages of the known solutions by proposing globalized management of the dynamic reconfiguration of heterogeneous systems on board an aircraft.

In this scheme, the invention is aimed in particular at an on-board aeronautic center comprising a plurality of heterogeneous equipment items communicating according to separate protocols or formats and capable of processing commands for operation of the aircraft, at least part of the said equipment items being reconfigurable, the system comprising a reconfiguration management center set up to receive state messages from the said plurality of equipment items and to emit reconfiguration messages destined for the said reconfigurable equipment items as a function of a plurality of received state messages, in which system:
  the said heterogeneous equipment items encompass monitoring means capable of emitting the said state messages according to the same format, and
  the reconfigurable equipment items encompass reconfiguration means capable of processing at least one of the said reconfiguration messages in such a way as to reconfigure the said associated equipment item.

Within the context of the invention, the monitoring and reconfiguration agents or means encompassed in the assembly of equipment items serve as interface with the reconfiguration center and, by the use of a common format, eliminate the heterogeneity of the equipment items. The heterogeneous equipment items equipped in this way are in particular shelf components or COTS ("Components Off-The-Shelf") of logical or physical type, meaning that they were not specifically developed for precise applications of aeronautic type. Examples of physical COTS: central processing units CPU, memories, power supply units, etc.

By virtue of the invention, instead of replacing the heterogeneous equipment items by homogeneous items, the same heterogeneous equipment items already in place are retained by associating them with monitoring/reconfiguration modules, in order to impart globalized dynamic reconfiguration functionality to the system. It is therefore observed that the function of homogenization of equipment items is in this case shifted at least partly on each of the heterogeneous equipment items by the use of on-board monitoring/reconfiguration means, although the decision system pertaining to the reconfiguration is operated globally by the management center.

In addition, the reconfiguration center according to the invention is provided with a global view of all of the heterogeneous equipment items of the system, and consequently it is able to propose an effective reconfiguration thereof by taking into account the global nature of the system.

In this way it is possible to become free of the heterogeneity and constraints of systems such as those currently on board aircraft.

According to one characteristic of the invention, the system comprises:
- a communication network on board the aircraft to connect the reconfiguration management center, the said plurality of heterogeneous equipment items and other systems on board the aircraft,
- a dedicated separate network for reconfiguration carrying state messages and the said reconfiguration messages between the reconfiguration center and the said plurality of heterogeneous equipment items.

By virtue of this arrangement, the reconfiguration data, particularly sensitive in view of the impact that they may have on the entirety of the airplane, are isolated from the Ethernet network or from any other traditional network on board the airplane. The use of a dedicated network is therefore an element of safety for the airplane.

According to one embodiment of the invention, the said communication network and dedicated network are supported by two separate physical networks. This physical isolation is safe but sometimes constraining (physical deployment, additional weight, etc.).

Thus, according to one variant, the said communication network and dedicated network are two virtual networks supported by the same physical network, for example sub-networks or virtual private networks known as VPN. Logical and/or software means are therefore used to ensure mutual segregation of the reconfiguration data carried on the said dedicated network and any data whatsoever carried on the other network, of Ethernet type, for example.

In one embodiment, the said plurality of heterogeneous equipment items is grouped into a plurality of coherent assemblies of equipment items, for example according to similar functions or modes of operation, each coherent assembly comprising a means for concentrating all of the state messages emitted by the equipment items of the coherent assembly and generating a general state message destined for the said reconfiguration center.

These arrangements converge toward a supplementary benefit of the present invention, according to which grouped management of equipment items is achieved in order to ensure effective reconfiguration of similar functions performed in the airplane. In fact, a plurality of equipment items may contribute together to the achievement of a specific function, and their reconfiguration must therefore be coherent.

This approach is also applied to equipment items functioning in identical manner (parallelism of tasks, for example).

According to one particular characteristic of the invention, each coherent assembly comprises a driver means capable of processing a reconfiguration message emitted by the reconfiguration center in such a way as to drive each of the said reconfigurable equipment items of the coherent assembly through the said on-board reconfiguration means.

By virtue of this configuration, processing of the reconfiguration is distributed between the management center, which furnishes a global approach to the reconfiguration (for example, a general reconfiguration instruction), and each coherent assembly, which individually handles the high-level general reconfiguration instruction as reconfiguration commands adapted for each of the equipment items under its control.

This approach makes it possible in addition to relieve the management center of part of the processing relating to the reconfiguration.

In addition, by virtue of these arrangements, it is easy to modify or replace a function (in other words, a coherent assembly) of the airplane without impacting the management center.

According to another particular characteristic of the invention, the said concentration means emits messages relating to the state of activity of the said equipment items of the assembly over the said dedicated network and messages relating to the state of health of the said same equipment items over the said on-board communication network.

This configuration makes it possible to retain the current on-board architectures in which there is provided a central maintenance system connected to the traditional communication network. Thus this maintenance system continues to receive messages about the state of health of equipment items via the traditional network of Ethernet type.

In one embodiment of the invention, the said reconfiguration center is set up to process all of the said state messages and messages emitted by other on-board systems, such as a flight monitoring system, a centralized maintenance system, an on-board maintenance terminal and an on-board configuration system, in such a way as to generate the said reconfiguration messages. In particular, the centralized maintenance system may have received state messages from the plurality of equipment items and may emit a message summarizing the said messages to the management center.

Correlatively, the invention is aimed at a method for reconfiguration of an on-board aeronautic system comprising a plurality of heterogeneous equipment items communicating according to separate protocols or formats and capable of processing commands for operation of the aircraft, at least part of the said equipment items being reconfigurable,
the method comprising the following steps:
reception, by a reconfiguration management center, of a plurality of state messages from the said plurality of equipment items;
emission, by the same management reconfiguration center, of reconfiguration messages destined for the said reconfigurable equipment items as a function of a plurality of received state messages,
and in which the said state messages are emitted according to the same format by monitoring means encompassed in each of the said equipment items,
and the reconfigurable equipment items each encompass reconfiguration means capable of processing at least one of the said reconfiguration messages in such a way as to reconfigure the said associated equipment item.

Optionally, the system may comprise means relating to the characteristics of the foregoing initialization method.

According to one characteristic, messages about the state of activity of equipment items and the reconfiguration messages are transmitted over a network dedicated to the reconfiguration, and messages about the state of health of equipment items are transmitted over a separate on-board communication network of the aircraft.

In particular, the said reconfiguration center collects the messages received through the two separate networks, determines the impact of the said state messages on the state of at least one reconfigurable equipment item and, as the case may be, generates one of the said reconfiguration messages destined for at least the said reconfiguration equipment item and more generally for a driver means of a coherent assembly as introduced in the foregoing.

According to one embodiment, the effective reconfiguration of a reconfigurable equipment item leads to the transmission, by the said means for monitoring the reconfigured equipment item, of at least one state message to the reconfiguration management center in such a way that this center conducts a verification of the said reconfiguration.

The invention is also aimed at an aircraft comprising a system such as presented hereinabove.

Optionally, the aircraft may comprise means relating to the system characteristics presented hereinabove.

Thus the invention permits great flexibility of use of aeronautic systems even in the presence of extensive heterogeneity of the equipment items of which it is composed.

Beyond equipment items that are themselves reconfigurable, the invention also makes it possible to extend the field of monitoring to non-reconfigurable equipment items that may have a useful function in the general behavior of systems.

In addition, the physical architectures or systems used may be simplified, since the dynamic reconfiguration according to the invention makes it possible to adapt them to quasi-instantaneous needs.

Other special features and advantages will become more apparent in the description hereinafter, illustrated by the attached drawings, wherein.

Figure 2:
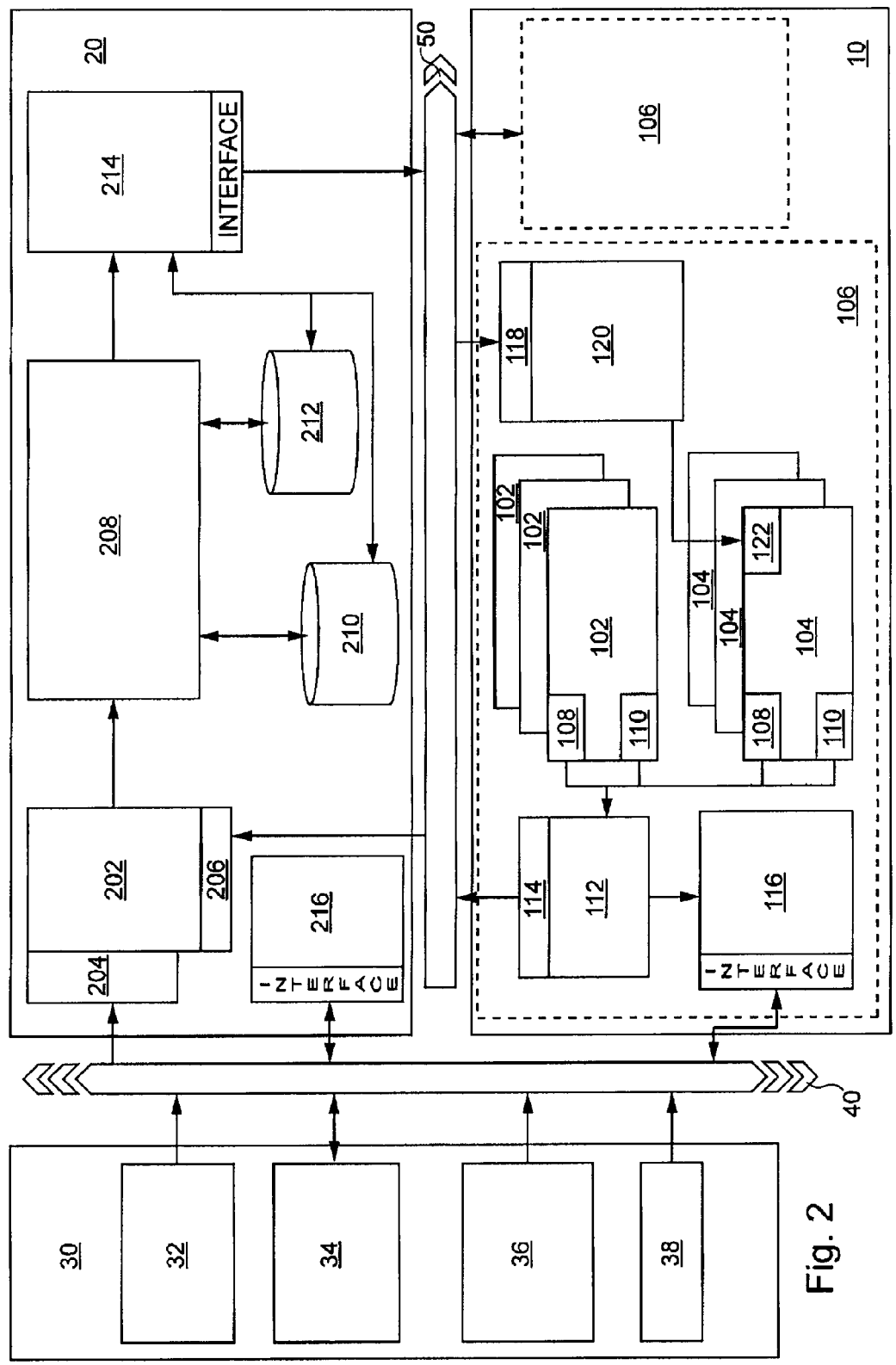
FIG. 2 is a schematic block diagram of detailed elements constituting the invention in the high-level view of FIG. 1.
Figure 3:
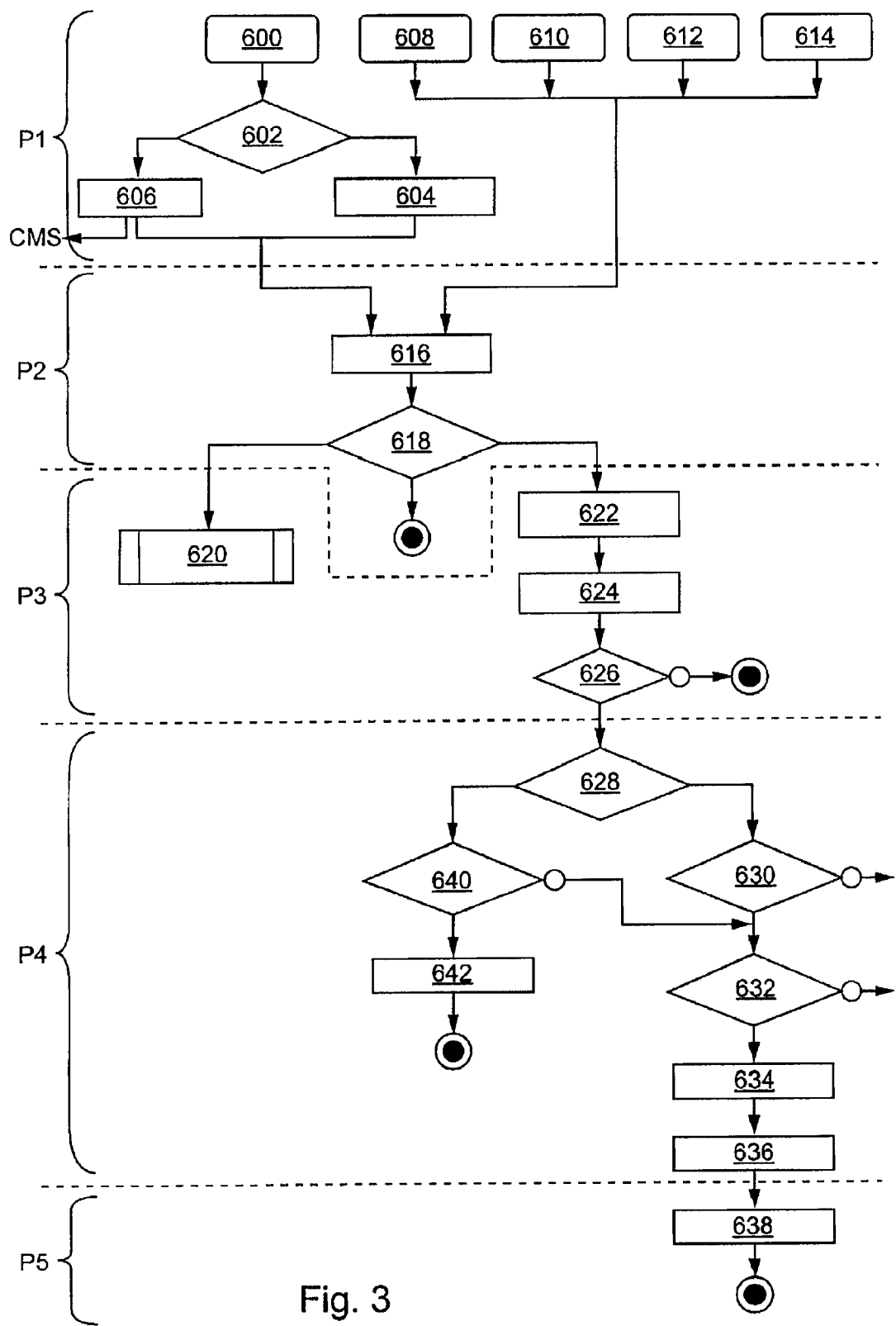
FIG. 3 represents, in the form of a logic diagram, an example of a traditional reconfiguration procedure for a system according to the invention.
Figure 7:
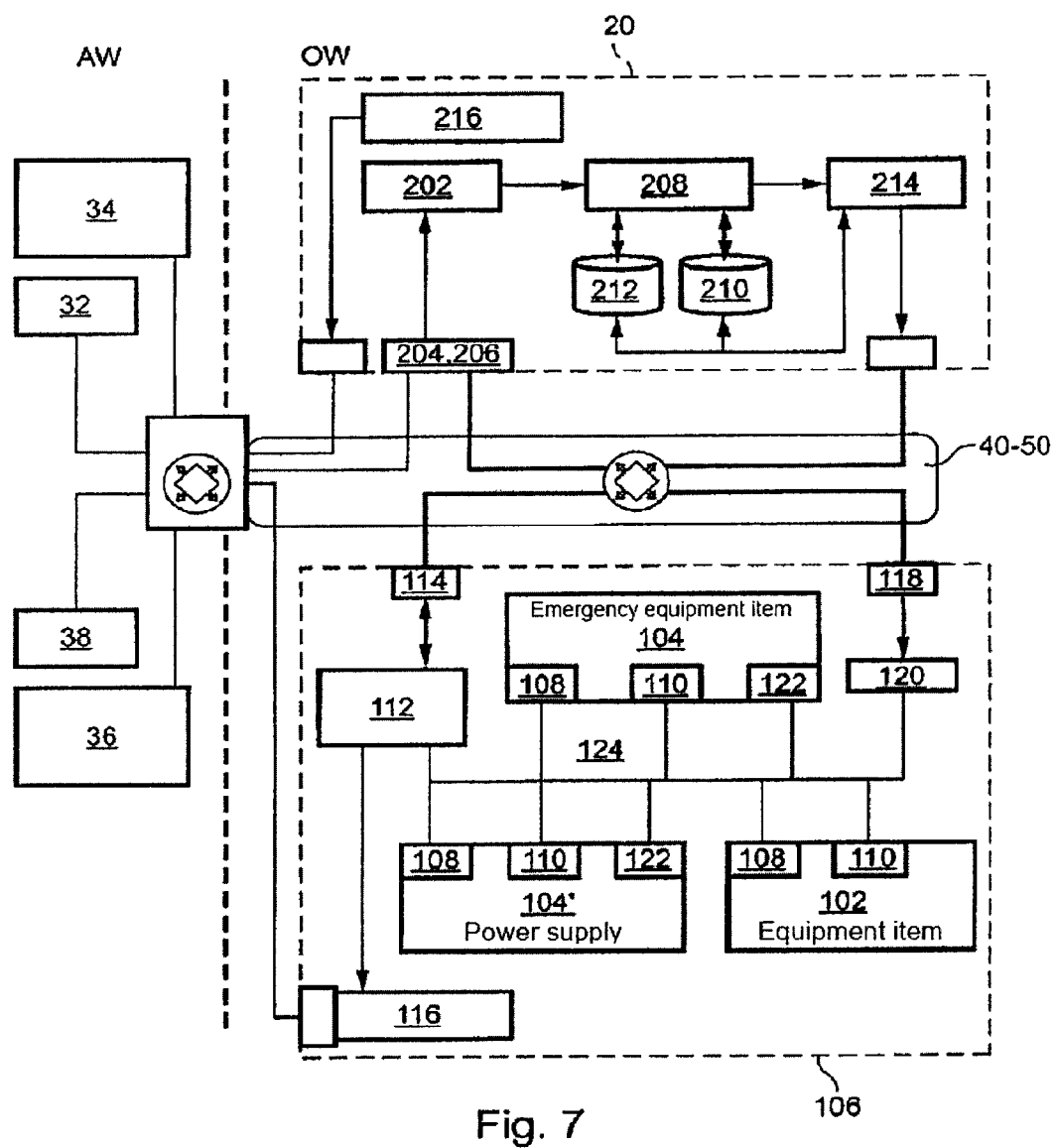
Figure 8:
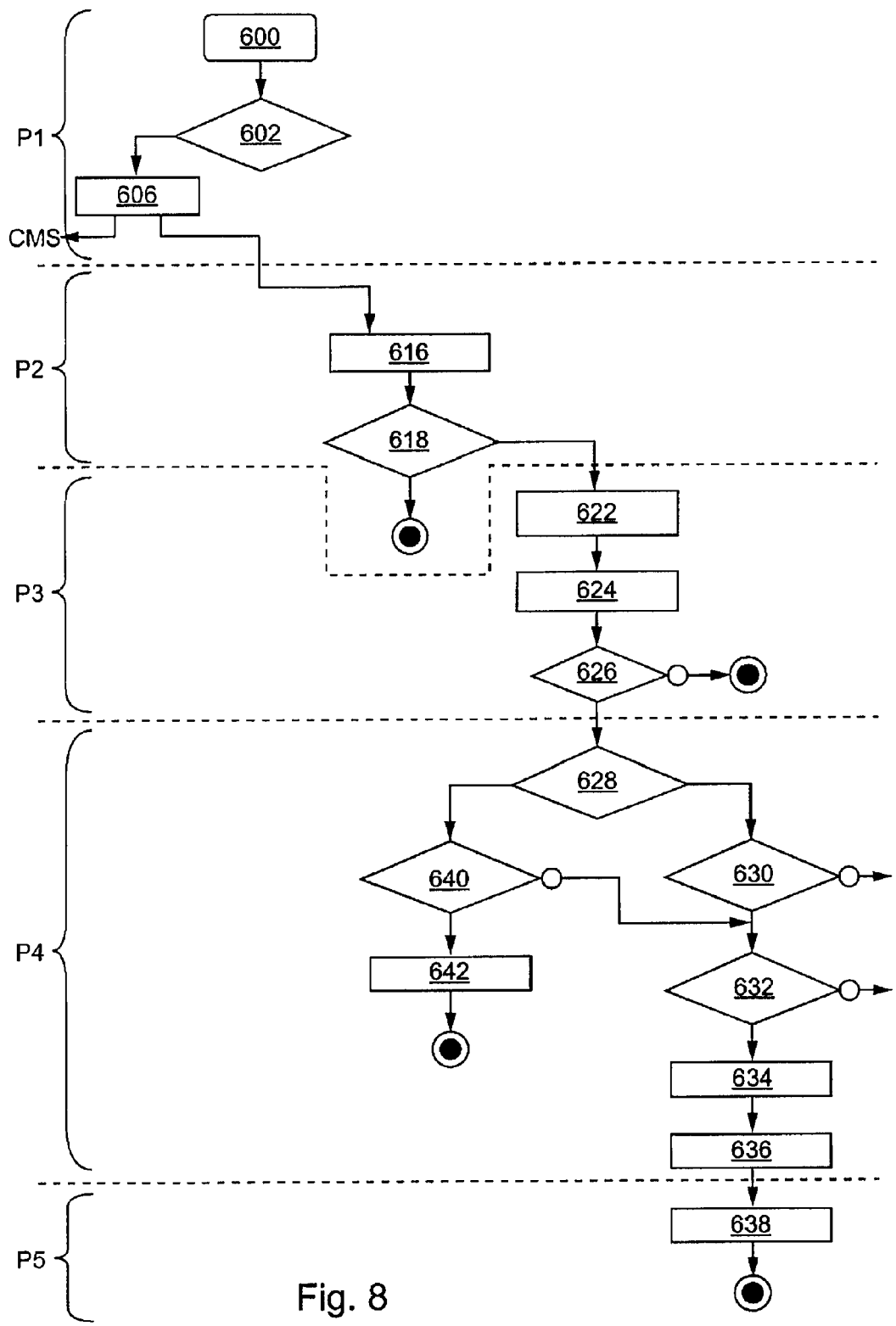

FIG. 7 an example of the system of FIG. 2, applied respectively to allocation of a microprocessor CPU and to the reconfiguration of a shared item of emergency equipment according to the invention; and FIG. 8 illustrates the different steps of FIG. 3 applied to the case of FIG. 7 according to the invention.

Figure 1:
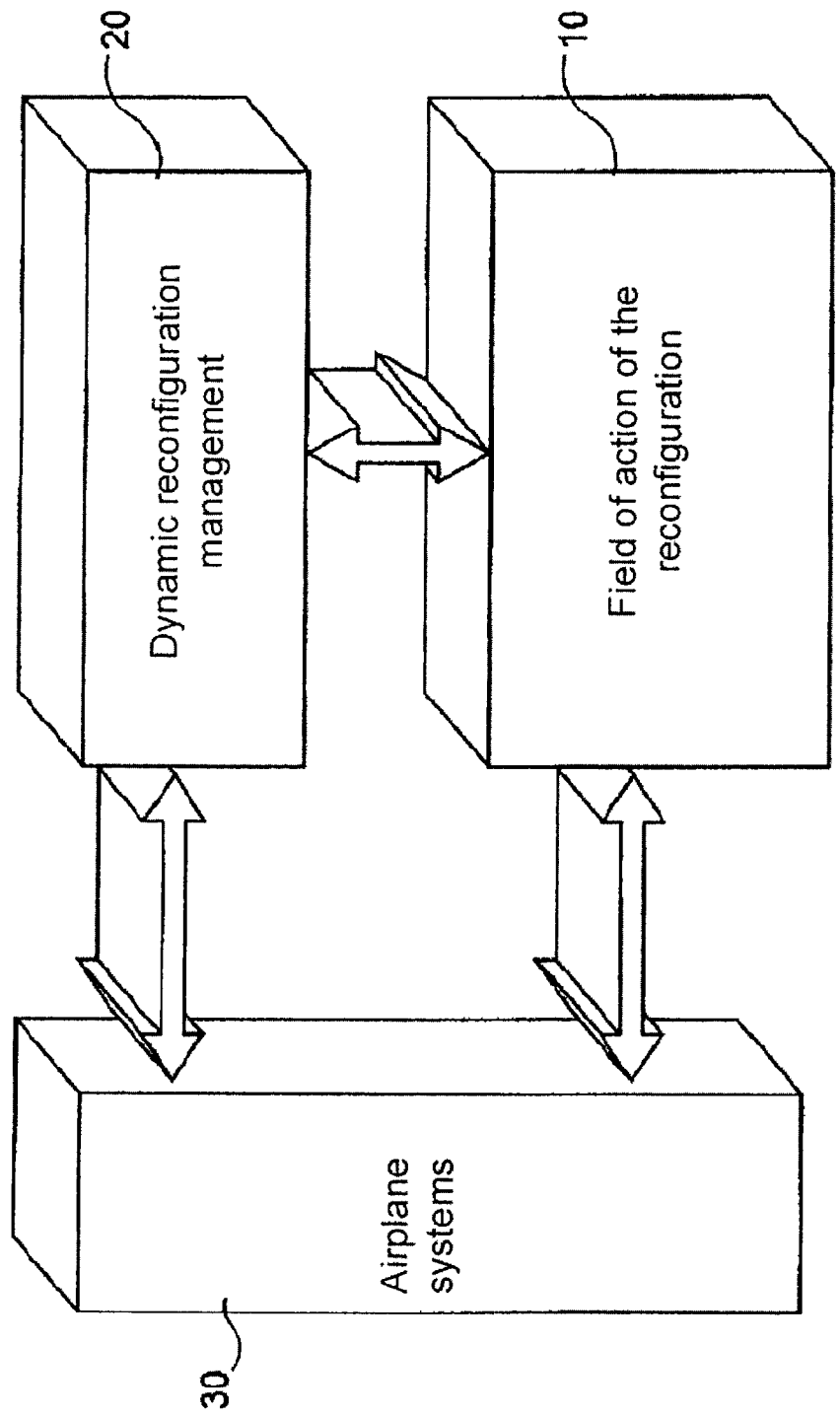
FIG. 1 is a high-level block diagram of elements taking part in the reconfiguration process according to the invention.

As illustrated in FIG. 1, an airplane equipped with the system according to the invention comprises an assembly 10 of elements or equipment items subjected to the reconfiguration function according to the invention and defining a field of action for the reconfiguration, a reconfiguration management system or center 20 for assembly 10 and other airplane systems 30.

These systems 30 may be flight control, communication, navigation, data-processing systems, etc.

In general, according to the invention, reconfiguration system 20 acts on an assembly 10 of elements. These elements also interact with the other airplane systems 30 either via their own function or in connection with sending maintenance information items, for example. Dynamic reconfiguration system (20) itself also interacts with the other airplane systems 30 in order to inform the airplane of its state and to collect items of information about the environment in which the reconfiguration function is evolving (for example, updates).

Reconfiguration system 20 can therefore drive the elements of assembly 10 to be reconfigured as a function of the information items received from these and other airplane systems 30.

By way of example, the reconfiguration may be directed at dynamic allocation of shared resources, such as a microprocessor, a random-access memory, a storage memory, a network or a distribution of energy of an on-board equipment item, as a function of different constraints.

In particular, the pass band of a network may be allocated as a function of the different flying phases of the airplane. In fact, when the airplane is on the ground, it is common practice to make large data transfers (uploading of data, or transmission of flight reports and measurement/maintenance data). Thus, by means of a priority mechanism, it is possible to provide that the pass band associated with specific equipment items will be broadened when a landing signal is transmitted to reconfiguration system 20.

Similarly, it is possible to take into account the state of operation of an equipment item in order to modify the allocation of resources. In fact, when a function or an equipment item becomes partly or completely non-functional, it is useful to allocate the resources specific to it to other equipment items/functions in order to improve and optimize the systems on board the airplane.

Also in the field of dynamic allocation, it is noted that resources (CPU, random-access memory) are currently allocated in static manner: each resource is allocated to an application for a certain time. Thus, at a given moment, one resource may be saturated by numerous applications while another equivalent resource is only slightly utilized. Depending on the priority of the applications, therefore, it may be useful to allocate the workload in more equitable manner among the different equivalent resources.

Other types of examples relate to reconfiguration in response to a failure in order to compensate for the failing function/equipment item.

In one example, this reconfiguration is based on an intelligent basic board (or "intelligent backplane"), which manages a plurality of digital processing cards. By measuring the state of each of the cards, it is possible to allocate, to a new unused card, the functionality that would be lost due to failure of another card. From a networking viewpoint, this assignment consists in transferring the partitions, or in other words the applications and their general configurations generally related to their execution environments, from the failing card to the new card, and re-routing the communication data to the new card. In this way it would be possible to transfer a functionality of an information terminal (OIT, for "on-board information terminal") from a failing terminal OIT to a terminal OMT ("on-board maintenance terminal") having a similar physical architecture.

In another similar example, it is possible to use reconfigurable emergency equipment items as a function of the failing equipment item, in order to limit the number of emergency equipment items necessary in the airplane and therefore the weight on board the latter.

In a final example, it may be appropriate to dynamically reconfigure network routing tables (correspondence between a network address and a physical address). In fact, in the case of failure of an equipment item, an attempt is then made to dynamically reassign the network address used by the failing equipment item to a new equipment item performing the same function, without impacting the other equipment items or systems.

By virtue of the invention, the states of a plurality of on-board equipment items are taken into account regardless of their nature, in order to drive the reconfiguration of certain of these equipment items intelligently, as in the examples already introduced and in those to be presented hereinafter.

Different other airplane systems 30 are represented in more detail in FIG. 2: an airplane configuration module 32, a monitoring module for maintenance (CMS or "centralized maintenance system") 34, a flight-tracking module 36 and an on-board maintenance terminal (OMT or "on-board maintenance terminal") 38. All of these modules and other modules represented in FIG. 2 can be employed through adapted software or hardware.

Airplane configuration module 32 makes it possible to update different systems in the airplane and in particular reconfiguration management system 20, especially each of the functions of which it is composed, in order to impart evolution capacity to the systems, for example.

The integration of new elements into field of action 10 being tracked for the reconfiguration also leads this configuration module 32 to redefine the field of action of system 20 by reconfiguring it, so that system 20 will take the new integrated element into account. It also leads to modifying the reconfiguration decision criteria used by this system 20 in order to take the new element into account also. This reconfiguration can be achieved, for example, by means of the on-board downloading system.

Maintenance monitoring module CMS 34 collects items of information about the state of health of different elements of field of action 10 as well as about reconfiguration system 20. As will be seen hereinafter, different modules of "Built-in Test Equipment" type or BiTE monitoring the different elements and equipment items of systems, for example via tests conducted on request of CMS 34, generate signals destined for monitoring module CMS 34.

In response, module CMS 34 may construct summary messages about the state of health of the different elements to be monitored and transmit a corresponding message to reconfiguration module 20, so that this will be taken into account in the estimates and decisions concerning reconfiguration of elements of field of action 10.

Flight-tracking module 36 receives items of information from on-board flight systems and delivers to dynamic reconfiguration system 20 a state of the flying phases of the airplane and in particular the modifications of flying phases. The dynamic reconfiguration can therefore take these flying phases into account, for example by preventing reconfiguration during the takeoff or approach and landing phases.

Finally, on-board maintenance terminal 38 transmits to reconfiguration system 20 commands from maintenance personnel pertaining to the reconfiguration function, for example to prevent dynamic reconfiguration during a test or maintenance operation.

These different airplane systems 30 are connected to traditional airplane network 40 of Ethernet-AFDX type ("Avionics Full DupleX"). As an example, this computerized network may be that supporting the on-board entertainment systems ("In-Flight Entertainment" according to English terminology).

Again with reference to FIG. 2, field of action 10 for reconfiguration comprises a plurality of equipment items 102, 104 being monitored, those equipment items making it possible to execute different functions for operation of the airplane: for example, operational functions (mission management, diagnostic aid) or even more avionic functions such as driving of mechanical elements such as landing gears or flaps, processing and calculations on flight or navigation data, calculation of takeoff performances, use of a meteorological map, ground navigation aid, etc.

These equipment items 102, 104 are either software elements or hardware elements.

Certain equipment items 102 are not reconfigurable, while others 104 are, meaning that they can be changed from one operating configuration to another, for example by modifying certain operating parameters.

Equipment items 102, 104 are globally heterogeneous over the entirety of field of action 10 and are grouped within domains 106. Each domain forms a coherent assembly of equipment items 102 and 104, which together accomplish a particular function for the airplane or which have identical operation. For example, all equipment items for GPS navigation are grouped in the same coherent domain. It is understood here that the reconfiguration must be processed in coherent manner for equipment items cooperating closely with one another for common execution, or in similar manner for identical equipment items.

The different domains 106 of field of action 10 for reconfiguration are connected to a network 50 dedicated to the transfer of information items relating to the reconfiguration and of reconfiguration commands. This network 50 is a computerized network of the VPN type ("virtual private network"), logically separate from airplane network 40 but employed on the same physical network. There then results extensive segregation between the data transported on the two networks, in such a way as to guarantee a high degree of safety of data/commands relating to the reconfiguration.

Alternatively, two separate physical networks may be used.

Concerning monitoring of domains 106, each equipment item 102, 104 of field of action 10 is provided with monitoring means, in this case software or hardware agents acting as centralizer of the state data issued by transducers in the equipment items that they are monitoring. As will be seen hereinafter, these agents perform an interface function between the heterogeneous transducers of different equipment items and the airplane/reconfiguration management elements external to these equipment items (for example, to transmit standard data of AFDX type over a bus via a standard protocol of ABD 100 type).

There are provided an agent 108, known as the health agent, for monitoring the state of health of the equipment, and an agent 110, known as the activity agent, for monitoring the state of activity of the same equipment item.

The items of information about health relate to the integrity of operation of the equipment item under consideration, or in other words its level of failure in the requested processing operations, whereas the items of information about activity relate to the level of utilization of the resources of the equipment item for accomplishment of processing tasks.

These agents form a first level of interface between the specific nature of monitored equipment item 102, 104 and the generic nature of high-level reconfiguration management system 20.

Health agent 108 collects items of information about the health of monitored equipment item 102, 104, for example the available power-supply capacity representing an item of information about fine granularity (specific to an element) relative to the entirety of the system. Of course, threshold values at which these items of health information are critical and trigger emission of state messages are defined. Consequently, software or hardware transducers and an ad hoc microcontroller are provided. It selects the useful items of information, for example as a function of measured values and defined threshold values, and then transforms them into a format common to the domain 106 under consideration, before transmission to an information concentrator 112. Thus these information items are then translated into a power-supply breakdown, necessary, for example, to making the reconfiguration decision.

Similarly, activity agent 110 collects items of information about fine granularity relative to the activity of the equipment item, for example the load on a processor, the level of utilization of a memory, the output current of a power supply, the stress on mechanical means, etc. There are then defined threshold values, at which a state message is emitted. It selects the useful information items, for example as a function of measured values and defined threshold values, and then transforms them into a format common to the domain 106 under consideration, before transmission to information concentrator 112.

A single concentrator module 112 per domain 106 therefore receives and collects the information items originating from different agents 108, 110 present in the same domain.

The entirety of these information items is processed, for example according to pre-established rules, to translate the received items of information about fine granularity and to format them if necessary for sending to avionic data buses 40, 50. In this way it delivers a state report either of equipment item 102, 104 in question or of the entire domain 106.

If this report concerns the activity of the equipment item, it is transmitted over dedicated network 50 via an appropriate communication interface 114, destined for reconfiguration system 20 and more precisely for a collecting module 202 such as explained hereinafter. In this case there is used a format common to the entirety of domain 106 and compatible with system 20 and collecting module 202.

On the other hand, if the report concerns the health of the equipment item, this is transmitted to an integrated test module 116 (or BiTE module as introduced in the foregoing) specific to domain 106 and which can communicate with CMS 34.

This BiTE module 116, via tests conducted (sometimes by instruction of CMS module 34) or the health reports received, detects operating faults of equipment items in the domain, isolates them and verifies them. Via airplane network 40, it then transmits a message about the state of health either of domain 106 or of equipment item 102, 104 under consideration, destined for CMS module 34 and/or directly for the aforesaid collection module 202. For each domain, therefore, BiTE module 116 centralizes the faults specific to each equipment item (function, hardware, etc.).

As will be seen hereinafter, these messages about the state of health/activity received by reconfiguration system 20 lead the latter to generate, on dedicated network 50, commands for reconfiguration of equipment items 104, all of the commands having the same communication format independent of reconfigurable equipment items 104.

Concerning the execution of reconfiguration commands transmitted by reconfiguration system 20 over dedicated network 50, these are received, via a communication interface 118, by a driver module 120 provided in each domain 106 to drive the reconfiguration of each of the reconfigurable equipment items 104 thereof. Driver module 120 is provided with a conversion table associating an action demanded by configuration system 20 with a set of processes permitting effective reconfiguration of equipment items within the domain 106 that it represents.

After determination of these local reconfiguration processes, driver module 120 sends reconfiguration messages comprising data about employment of reconfiguration actions to the assembly of reconfigurable equipment items 104 in question. The equipment items in question are those targeted in the reconfiguration command transmitted by system 20 or those targeted in the conversion tables.

Each reconfigurable equipment item 104 also comprises a reconfiguration agent 122, which receives the reconfiguration messages of module 120 and translates them into command signals or actions specific to the equipment item (software or hardware) to be reconfigured.

Upon reception of these specific commands, a traditional local reconfiguration is conducted within each targeted equipment item 104.

It is noted here that monitoring agents 102, 104 will detect the change of state of the equipment following execution of the command signals. Associated messages reporting the executed reconfiguration (reconfiguration reports) are then emitted over dedicated network 50 to concentrator 112 as described hereinabove, then are relayed to reconfiguration management system 20.

Again with reference to FIG. 2, reconfiguration management system 20 common to all of the domains 106 of the airplane comprises, as indicated hereinabove, a collection module 202 connected to both airplane network 40 and dedicated network 50. Since this is the entry point of reconfiguration system 20, a safety requirement of the collection module is sought. Thus collection software 202 is validated by a safety analysis of its function (FHA for "Functional Hazardous Analysis"), in order to determine a sufficient level of criticality of this software (DAL level, for "Design Assurance Lever"), level E according to Standard DO-178B being sufficient for example, and redundancy elements are used for the communications.

Collection module 202 therefore receives, via interface 204, over network 40:

from CMS module 34 or BITE modules 116 of domains 106, the state of health of different equipment items involved in making the reconfiguration decision, and especially reconfiguration reports of an equipment item 102, 106 of the domain 106 in question (in the case of BiTE modules);

from flight tracking module 26, an indication of the current flying phase of the airplane;

from maintenance terminal 38, a command about the reconfiguration mode desired by an operator. As an example, this command may be a return to the so-called "factory" configuration, a demand for execution of a particular reconfiguration, such as a test, or a prohibition of any reconfiguration until a new order.

In parallel, it may also receive, from configuration module 32, commands to update or configure components of reconfiguration system 20.

Via interface 206 on network 50, collection module 202 continuously receives items of information about the performances and activities of equipment items 102, 104 situated in a domain 106 (messages about the state of activity).

Once the information items have been collected from these different sources, module 202 identifies the emitter of each received message in order to determine whether such message can be transmitted. In fact, the messages from certain sources may be disregarded.

A parallel function of collection module 202 is to determine, in the prolonged absence of information, if this results from the absence of pertinent state information, which leads to the absence of sending of information until a new useful information item exists, or if this results from a failure of one of the modules communicating with it. For example, module 202 monitors the frames and the signal at the level of interface 204. Thus it can distinguish line cuts (no signal) or the absence of information (signal present but empty data).

In the latter case (failure), collection module 202 may consider making use of a message about the state of health ("failing state") of the module communicating with it, and an action to reconfigure the failing module may be undertaken as described hereinafter. In addition, the result of this determination may be taken into account in the decision about actions for reconfiguration of different domains (other than the failing module).

The information items recovered in this way and if necessary extracted from a communication format on the network are then transmitted to an analysis module 208. Nevertheless, the information items originating from airplane configuration module 32 are directed toward a function for updating (not represented) of reconfiguration system 20.

Analyzer 208 decodes each information item transmitted by module 202, then determines if this information item has just given notification of a modification of the state of an equipment item 102, 104 situated in field of action 10 for the reconfiguration or if this information item is capable of modifying the operation of reconfiguration system 20, for example modification of flying phases, new command for the mode of reconfiguration from terminal 38.

Depending on the information items received, analyzer 208 stores the state of the airplane in memory in "airplane status" database 210 (for example, the flying phase, etc.) and stores the new state of equipment items 102, 104 in memory in "domains status" database 212. It then notifies the downstream module 214, known as the decision module, that a new event has occurred and must be taken into consideration.

Module 214 is at the heart of reconfiguration system 20, because it is the one that conducts the determination of reconfiguration actions to be undertaken. This determination is not particularly deterministic, but it must certify that two similar situations will lead to two identical actions. Thus it is possible to resort to conversion tables (models) associating predefined actions with known scenarios/conditions, or to resort to more complex systems making it possible to take new, unanticipated situations into account, such as neural networks receiving as input the state of domains 106 and other information items from systems 30.

Upon reception of a notification, decision module 214 accesses data bases 210 and 212 to recover the general state of the airplane and the states of equipment items, in order to rule on the utility of and capacity for reconfiguration of equipment items 102, 104. For this purpose, it verifies that the different states correspond to at least one model in memory, or in other words previously defined authorized configurations.

If the reconfiguration is judged to be useful, decision model 214 chooses the most suitable reconfiguration among all of the possibilities for reconfiguration offered to it. To achieve this, a priority is calculated for each possible model. The priorities are managed by the models, which take a certain number of criteria into account at the inputs. These are criteria with which the priorities can be defined.

Alternatively, the management of priorities may also pass through a management algorithm employed in the decision module.

When a reconfiguration is selected, decision module 214 addresses, to the targeted domains 106, the information items necessary for reconfiguration of equipment items 102, 104 thereof. Thus it transmits, to the targeted driver module(s) 120, a reconfiguration command containing an identifier of the action to be initiated and if necessary the equipment items affected by this reconfiguration.

Alternatively, this command may be of the type that stops a reconfiguration, for example if an operator demands cessation of all reconfigurations through terminal 38 or if the airplane has just passed into a flying phase that prohibits reconfiguration.

Finally, FIG. 2 shows a BITE module 216 with which reconfiguration system 20 is equipped. This test and monitoring module operates in a manner similar to that of BiTE modules 116, in such a way as to inform central monitoring module CMS 34, via network 40, of the state of different components of reconfiguration system 20.

Figure 4:
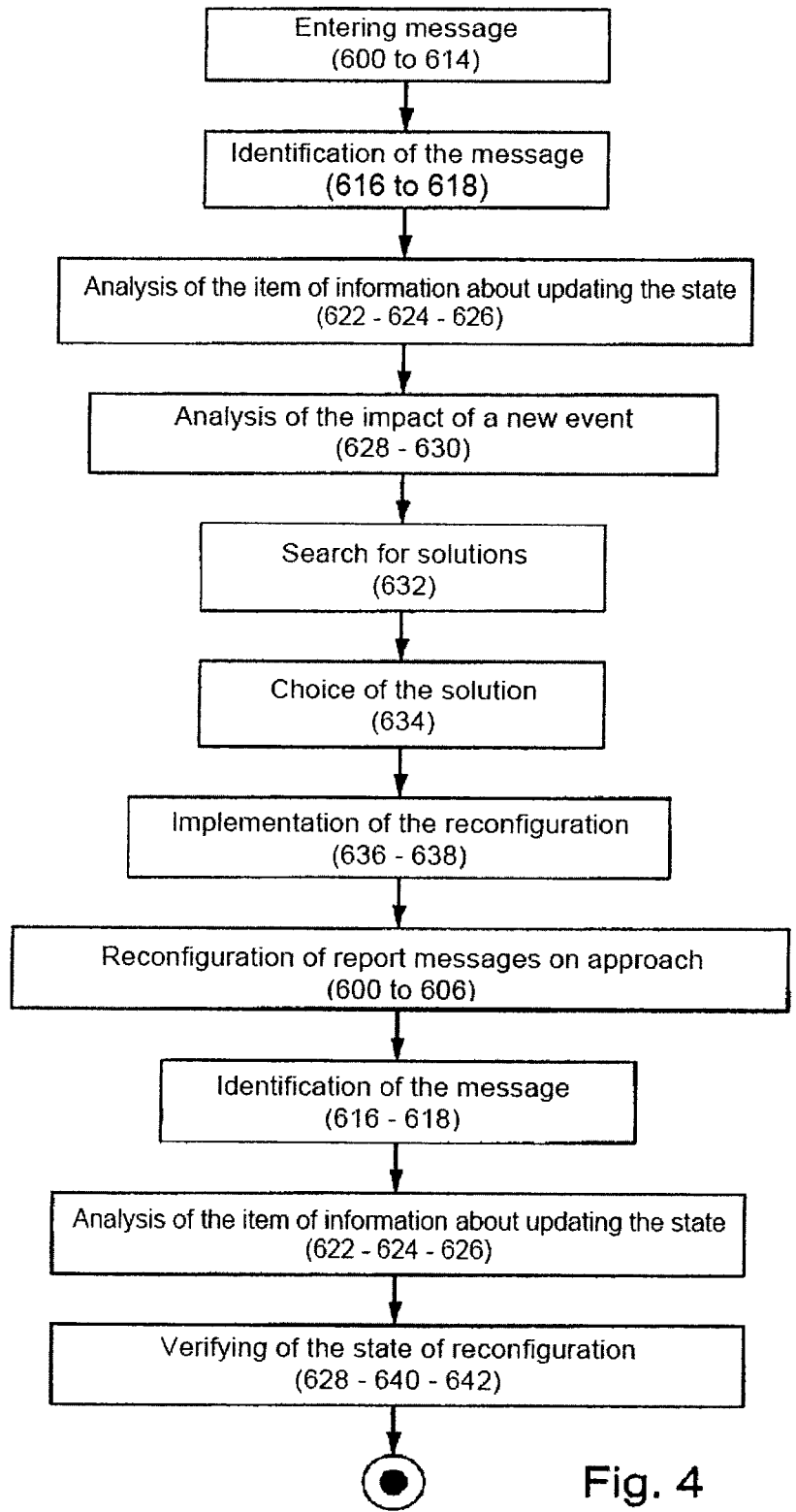
FIG. 4 illustrates, in relation to FIG. 3, the different steps employed during execution of a reconfiguration according to the invention.

FIGS. 3 and 4 show an example of a traditional reconfiguration procedure for a system according to the invention.

During a first phase P1 of generation of messages about the state of equipment items 102, 104 or systems 30, items of information about the state of activity or health are emitted, in step 600, by the different equipment items of a domain 106.

In step 602, concentrator 112 determines the type of information items received: health or activity.

In the case of state-of-activity type items of information, these are transmitted over dedicated reconfiguration network 50 during step 604, whereas the items of information about the state of health are transmitted over airplane network 40 during step 606.

In parallel, the information items issued from airplane configuration module 32, CMS module 34, flight-tracking module 36 and maintenance terminal 38 are transmitted over airplane network 40 in steps 608, 610, 612 and 614 respectively.

During a second phase P2 of collection, collection module 202 recovers, from buffer memory, during step 616, the information items sent previously over networks 40 and 50. Then, in step 618, this same collection module 202 determines the nature of the received data.

This is then followed by a third phase P3 of analysis.

In the case of data relating to system configuration 20, these are transmitted, in step 620, to configuration modules in order to update system 20 as a consequence: for example, addition of a new domain 106 or of a new equipment item 102, 104 in a domain, definition of new reconfiguration actions, etc.

In the case of information relating to the general state of the airplane or the particular state of an equipment item 102, 104, analysis module 208 determines, in step 622, the equipment item affected by the received information item.

During step 624, this module 208 therefore recovers, from databases 201 and 212, the preceding state of the equipment item in question, which module 208 then compares, in step 626, with the received and processed information item.

In the case of identical state, the processing is ended.

In the case of different state, or in other words if at least one equipment item has evolved in the airplane, a fourth decision phase P4 takes place, comprising determination of the type of information item received in a step 628.

In general, this information item will primarily be one that reveals a modified state. In this case, decision module 214 determines if actions must be undertaken in step 630. The process ends if there is no need to take any action and continues in step 632 if actions must be taken, by determining if these determined actions are available, or in other words compatible with the input criteria or states of the models of actions/scenarios.

In the affirmative, decision module 214 proceeds, during step 634, to choose the action that is most pertinent as a function of pre-established choice criteria. These may be criteria for guaranteeing service quality, for example substituting a CPU in breakdown condition, alleviating a shortage of memory resources, etc.

The chosen action is then stored in memory and transmitted over dedicated network 50 to one or more driver modules 120, during step 636.

Then, in step 638 of a fifth action phase P5, the chosen action is processed by driver module 120 to send specific reconfiguration instructions to each of equipment items 104 in question. The processing then ends by effective local reconfiguration of these equipment items 104.

If the information analyzed in step 628 is of the action report type, or in other words a message reporting an executed reconfiguration, decision module 214 determines, in step 640, if the action effectively conducted is consistent with the one prescribed, or in other words that recorded during step 636.

In the affirmative, the new state and configuration of the reconfigured equipment item are recorded, during step 642, in database 212 (in order to be available for future iterations of steps 624, 626). The processing then ends.

In the negative, the process is continued in step 632, in such a way as to command a new reconfiguration of the targeted equipment item.

FIG. 4 summarizes all of the steps associated with a reconfiguration. Initially there is seen the running of the different steps described hereinabove (with the exception of step 620) up to the execution of reconfiguration in step 628.

As indicated in the foregoing, this reconfiguration leads to a change of state of the equipment item 102, 104 in question and therefore to the transmission of a message, in this case a reconfiguration report, to collection model 202 (step 600 once again). Steps 602, 604 or 606, 616, 618, 622, 624, 626 and 628 are then conducted as detailed hereinabove.

Since the report is one of reconfiguration, the process continues to step 640 then if necessary to step 642, in such a way as to validate the reconfiguration conducted.

Thus it is seen that, to achieve a complete reconfiguration, the algorithm shown in FIG. 3 is run two times, in order first to conduct the reconfiguration and then subsequently to verify execution thereof.

Figure 5:
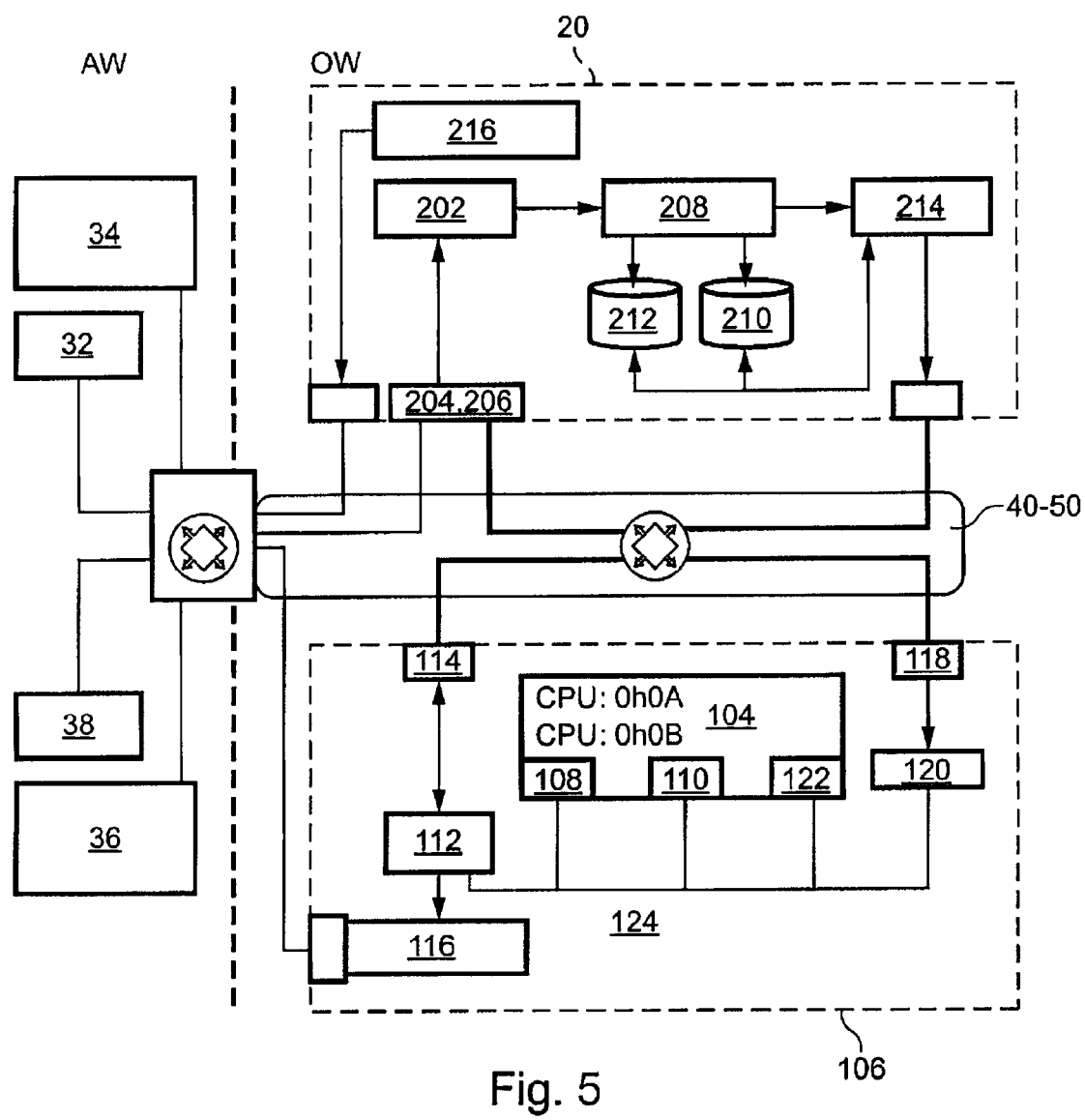
FIG. 5 illustrates an example of the system of FIG. 2, applied respectively to allocation of a microprocessor CPU ("central processing unit") and to the reconfiguration of a shared item of emergency equipment according to the invention.

FIGS. 5 and 7 show two examples of the system of FIG. 2, applied respectively to allocation of a microprocessor CPU ("central processing unit") and to the reconfiguration of a shared item of emergency equipment. The two examples employ the same reconfiguration management center 20, operating at different moments, for example.

The two systems have a single physical network that supports the two networks 40 and 50. The modules and systems of FIG. 2 are repeated in these figures with similar reference numerals.

In FIG. 5, domain 106 comprises a uniquely reconfigurable equipment item 104 of CPU type provided with two address ranges 0h0A and 0h0B that can be dynamically assigned by virtue of the invention. In this case it is endeavored to optimize the performances of this microprocessor 104.

Figure 6:
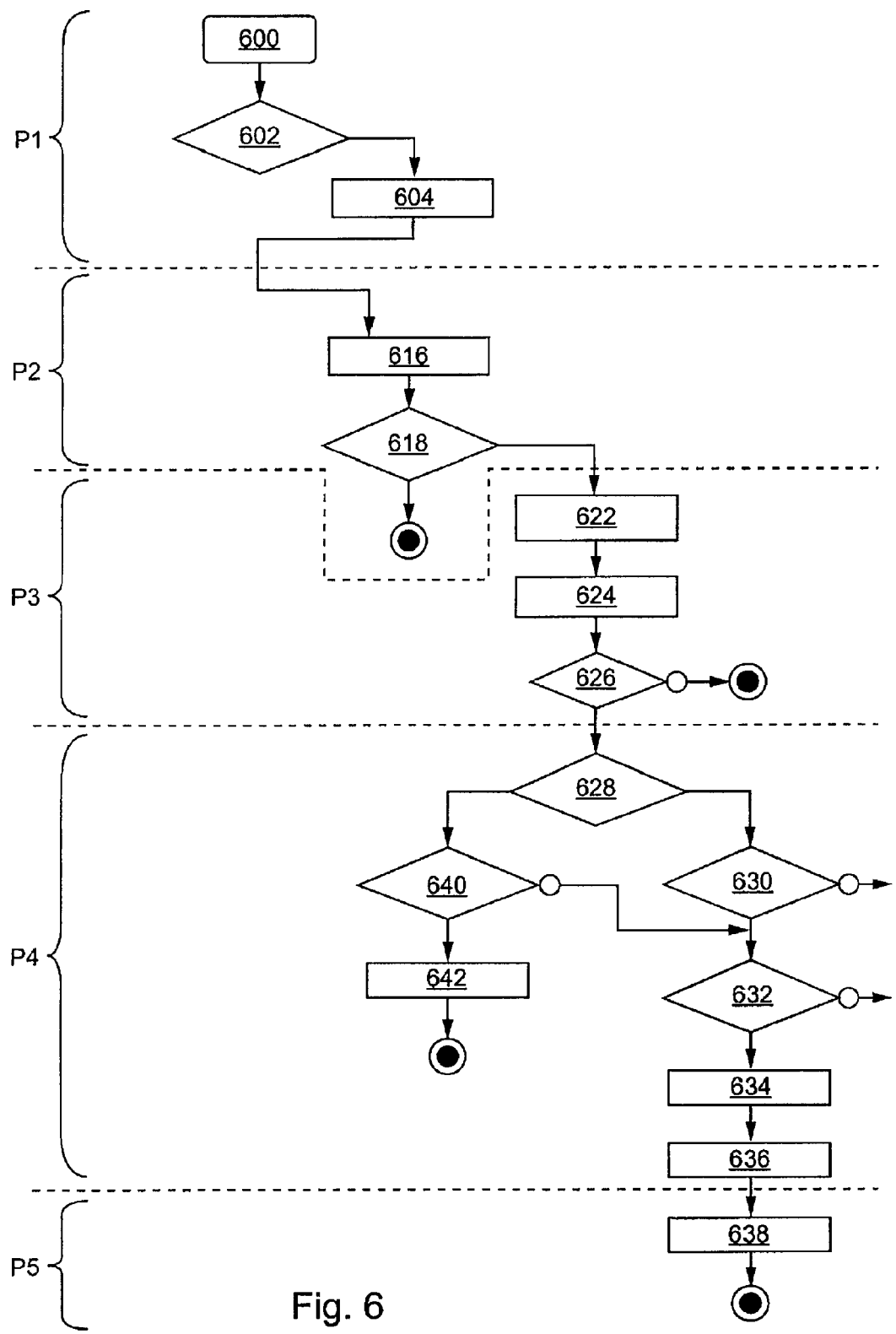
FIG. 6 illustrates the execution of the invention in the case of the CPU of FIG. 5 according to the invention.

FIG. 6 shows the execution of the invention in the case of the CPU of FIG. 5.

In this case the CPU allocation is achieved on the basis of an analysis of performance, or in other words activity. A performance state is therefore transmitted over dedicated network 50 (steps 600, 602 and 604).

The reconfiguration system then conducts an analysis as described hereinabove. If optimization of the performances is possible (determined by decision module 214), the reconfiguration system modifies the allocation dynamically in such a way that the efficacy of the CPU is always maximized, for example by assigning the two CPU addresses to the same software application.

In FIG. 7, domain 106 comprises a non-reconfigurable equipment item 102 in breakdown condition, a reconfigurable power-supply equipment item 104 and a reconfigurable emergency equipment item 104'.

As illustrated in FIG. 8, which shows the different steps of FIG. 3 applied to the case of FIG. 7, the reconfiguration of an emergency equipment item 104' is achieved on the basis of an analysis of the state of health. The state messages are transmitted via an internal bus 124 of domain 106 to concentrator 112. Ease of employment is based on an internal bus 124 of networking type.

Thus a message about the failing state of health of equipment item 102 is transmitted (step 600) by BiTE module 116 over airplane network 40 destined for CMS module 34 and/or reconfiguration system 20 (steps 602 and 606).

The following steps are identical to those of FIGS. 3 and 6. The reconfiguration commands are transmitted via internal bus 124 from driver module 120 to equipment items 104 and their reconfiguration agents 122.

The foregoing examples are only embodiments of the invention, which is not limited thereto.

Thus, even if the reconfiguration of equipment items of an open system (OW, for "Open World" in FIGS. 5 and 7) is envisioned, it can be conducted on equipment items of closed systems (such as the closed environment of airplane AW). In this case, to guarantee high safety and compatibility with certification processes, supplementary steps of verification of compatibility of configuration commands will be conducted.

The invention claimed is:

1. An on-board aeronautic system on an aircraft, the system comprising:
   a plurality of heterogeneous equipment items communicating according to separate protocols or formats and configured to process commands for operation of the aircraft, at least part of the equipment items being reconfigurable; and
   a reconfiguration management center configured to receive state messages from the plurality of equipment items, each indicating a state of operation of each of the plurality of equipment items, to determine whether each of the plurality of equipment items is functioning properly, and to emit reconfiguration messages destined for the reconfigurable equipment items as a function of the plurality of received state messages, at least one of the reconfiguration messages instructing to allocate a second reconfigurable equipment item with the functionality of a first equipment item that is determined to be malfunctioning, wherein
   the heterogeneous equipment items include monitoring units configured to emit the state messages according to the same format,
   the reconfigurable equipment items include reconfiguration units, each of the reconfiguration units configured to process at least one of the reconfiguration messages from the reconfiguration management center, and
   the reconfiguration unit of the second reconfigurable equipment item is configured to reconfigure the second reconfigurable equipment item to perform the functionality of the first equipment item via applications of the first equipment item that have been transferred to the second reconfigurable equipment item.

2. The system according to claim 1, further comprising:
   a communication network on board the aircraft to connect the reconfiguration management center, the plurality of heterogeneous equipment items, and other systems on board the aircraft; and
   a dedicated separate network for reconfiguration, the dedicated network carrying the state messages and the reconfiguration messages between the reconfiguration management center and the plurality of heterogeneous equipment items.

3. The system according to claim 2, wherein the communication network and the dedicated network are supported by two separate physical networks.

4. The system according to claim 2, wherein the communication network and the dedicated network are two virtual networks supported by the same physical network.

5. The system according to claim 2, wherein the plurality of heterogeneous equipment items is grouped into a plurality of coherent assemblies of equipment items, each coherent assembly including a concentration unit concentrating all of the state messages emitted by the equipment items of the coherent assembly and generating a general state message destined for the reconfiguration management center.

6. The system according to claim 5, wherein the concentration units emit messages relating to a state of activity of the equipment items of the coherent assembly over the dedicated network and messages relating to a state of health of the equipment items over the on-board communication network.

7. The system according to claim 1, wherein the plurality of heterogeneous equipment items is grouped into a plurality of coherent assemblies of equipment items, each coherent assembly including a concentrating unit concentrating all of the state messages emitted by the equipment items of the coherent assembly and generating a general state message destined for the reconfiguration management center.

8. The system according to claim 7, wherein each coherent assembly includes a driver unit configured to process a reconfiguration message emitted by the reconfiguration center and to drive each of the reconfigurable equipment items of the assembly through on-board reconfiguration.

9. The system according to claim 1, wherein the reconfiguration management center is configured to process all of the state messages and messages emitted by other on-board systems.

10. The system according to claim 1, further comprising:
a tracking unit configured to acquire information of a flying phase of the aircraft, wherein
the reconfiguration management center is configured to receive the information of the flying phase of the aircraft from the tracking unit, to determine whether to allow reconfiguration of the second reconfigurable equipment item, and to emit the reconfiguration messages, in response to a determination that reconfiguration is allowed.

11. The system according to claim 1, wherein the plurality of heterogeneous equipment items are components off-the-shelf (COTS).

12. A method for reconfiguration of an on-board aeronautic system on an aircraft, the system including a plurality of heterogeneous equipment items communicating according to separate protocols or formats and configured to process commands for operation of the aircraft, at least part of the equipment items being reconfigurable, the method comprising the following steps:
emitting, by monitoring units included in the heterogeneous equipment items, a plurality of state messages according to the same format, each of the plurality of state messages indicating a state of operation of each of the plurality of equipment items;
receiving, at a reconfiguration management center, the plurality of state messages from the plurality of equipment items;
determining, by the reconfiguration management center, whether each of the plurality of equipment items is functioning properly;
emitting, by the reconfiguration management center, reconfiguration messages destined for the reconfigurable equipment items as a function of the plurality of received state messages, at least one of the reconfiguration messages instructing to allocate a second reconfigurable equipment item with the functionality of a first equipment item that is determined to be malfunctioning;
processing, by a reconfiguration unit included in each of the reconfigurable equipment items, at least one of the reconfiguration messages from the reconfiguration management center; and
reconfiguring, by the reconfiguration unit of the second reconfigurable equipment, the second reconfigurable equipment item to perform the functionality of the first equipment item via applications of the first equipment item that have been transferred to the second reconfigurable equipment item.

13. The method according to claim 12, wherein messages about a state of activity of equipment items and the reconfiguration messages are transmitted over a network dedicated to the reconfiguration, and messages about a state of health of equipment items are transmitted over a separate on-board communication network of the aircraft.

14. The method according to claim 13, further comprising:
collecting, by the reconfiguration management center, the messages received through the two separate networks;
determining an impact of the state messages on the state of at least one reconfigurable equipment item; and
generating one of the reconfiguration messages destined for at least one reconfigurable equipment item.

15. The method according to claim 12, further comprising:
transmitting, by the monitoring unit of the second reconfigurable equipment item after the reconfiguring, at least one state message to the reconfiguration management center; and
conducting, by the reconfiguration management center, a verification of the reconfiguration.

16. An aircraft comprising:
an on-board aeronautic system including
a plurality of heterogeneous equipment items communicating according to separate protocols or formats and configured to process commands for operation of the aircraft, at least part of the equipment items being reconfigurable; and
a reconfiguration management center configured to receive state messages from the plurality of equipment items, each indicating a state of operation of each of the plurality of equipment items, to determine whether each of the plurality of equipment items is functioning properly, and to emit reconfiguration messages destined for the reconfigurable equipment items as a function of the plurality of received state messages, at least one of the reconfiguration messages instructing to allocate a second reconfigurable equipment item with the functionality of a first equipment item that is determined to be malfunctioning, wherein
the heterogeneous equipment items include monitoring units configured to emit the state messages according to the same format,
the reconfigurable equipment items include reconfiguration units, each of the reconfiguration units configured to process at least one of the reconfiguration messages from the reconfiguration management center, and
the reconfiguration unit of the second reconfigurable equipment item is configured to reconfigure the second reconfigurable equipment item to perform the functionality of the first equipment item via applications of the first equipment item that have been transferred to the second reconfigurable equipment item.

\* \* \* \* \*

UNITED STATES PATENT AND TRADEMARK OFFICE
CERTIFICATE OF CORRECTION

PATENT NO. : 8,577,521 B2  Page 1 of 1
APPLICATION NO. : 12/509866
DATED : November 5, 2013
INVENTOR(S) : Jean-Paul Genissel It is certified that error appears in the above-identified patent and that said Letters Patent is hereby corrected as shown below:

On the title page, Item (73), the Assignee information is incorrect. Item (73) should read:

-- (73) Assignee: Airbus Operations SAS, Toulouse (FR) --

Signed and Sealed this
Twenty-eighth Day of January, 2014

Michelle K. Lee
*Deputy Director of the United States Patent and Trademark Office*